United States Patent
Han et al.

(10) Patent No.: US 9,899,650 B2
(45) Date of Patent: Feb. 20, 2018

(54) RECHARGEABLE BATTERY HAVING TOP INSULATION MEMBER

(71) Applicant: Samsung SDI Co., Ltd., Yongin-si, Gyeonggi-do (KR)

(72) Inventors: Min-Yeol Han, Yongin-si (KR); Sang-Won Byun, Yongin-si (KR); Yong-Hee Yun, Yongin-si (KR); Zin Park, Yongin-si (KR); Soo-Seok Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 461 days.

(21) Appl. No.: 14/546,988

(22) Filed: Nov. 18, 2014

(65) Prior Publication Data

US 2015/0249241 A1 Sep. 3, 2015

(30) Foreign Application Priority Data

Feb. 28, 2014 (KR) ........................ 10-2014-0024715

(51) Int. Cl.
*H01M 2/12* (2006.01)
*H01M 2/34* (2006.01)

(52) U.S. Cl.
CPC ......... *H01M 2/1235* (2013.01); *H01M 2/345* (2013.01); *H01M 2200/20* (2013.01); *H01M 2220/20* (2013.01)

(58) Field of Classification Search
CPC . H01M 2/1235; H01M 2/345; H01M 2200/20
See application file for complete search history.

(56) References Cited

U.S. PATENT DOCUMENTS

| 8,642,196 | B2 | 2/2014 | Guen | |
|---|---|---|---|---|
| 2009/0111003 | A1* | 4/2009 | Kim | H01M 2/0413 429/53 |
| 2011/0287286 | A1* | 11/2011 | Ahn | H01M 2/1241 429/56 |
| 2012/0315515 | A1* | 12/2012 | Guen | H01M 2/0473 429/56 |
| 2012/0315516 | A1* | 12/2012 | Kim | H01M 10/0525 429/61 |
| 2013/0089759 | A1 | 4/2013 | Han et al. | |

FOREIGN PATENT DOCUMENTS

KR 10-2012-0136267 A 12/2012
KR 10-2013-0039178 A 4/2013

\* cited by examiner

*Primary Examiner* — Lisa S Park
(74) *Attorney, Agent, or Firm* — Lewis Roca Rothgerber Christie LLP

(57) ABSTRACT

A rechargeable battery includes an electrode assembly including first and second electrodes; a case accommodating the electrode assembly; a cap plate coupled to the case and having a short-circuit opening formed therein; a first electrode terminal electrically connected to the first electrode; a second electrode terminal electrically connected to the second electrode; a short-circuit member fixed to the cap plate in the short-circuit opening and configured to electrically connect the first electrode and the second electrode to each other; and a top insulation member covering the short-circuit member and having a plurality of air holes formed therein.

10 Claims, 11 Drawing Sheets

RECHARGEABLE BATTERY HAVING TOP INSULATION MEMBER

CROSS-REFERENCE TO RELATED APPLICATION

This application claims priority to and the benefit of Korean Patent Application No. 10-2014-0024715 filed in the Korean Intellectual Property Office on Feb. 28, 2014, the entire contents of which are incorporated herein by reference.

BACKGROUND

1. Field

The described technology relates generally to a rechargeable battery.

2. Description of the Related Art

A rechargeable battery is a battery capable of being repeatedly charged and discharged unlike a primary battery that may not be recharged. A low-capacity rechargeable battery has been used for small portable electronic devices such as a mobile phone, a notebook computer, and a camcorder, and a large-capacity rechargeable battery has been widely used as a power supply for driving a motor such as an electric bike, a scooter, a hybrid vehicle, a fork lift, or the like.

Recently, a high-power rechargeable battery using a non-aqueous electrolyte having high energy density has been developed, and the high-power rechargeable battery as described above is configured as a high-capacity battery module by connecting a plurality of rechargeable batteries in series to each other so as to be used for driving a motor of a device requiring high power, for example, an electric vehicle, or the like.

In addition, the rechargeable battery may be formed in a cylindrical shape, an angular shape, a pouch shape, or the like. In the rechargeable battery, a cathode includes a cathode current collector and a cathode active material layer disposed on both surfaces of the cathode current collector, and an anode includes an anode current collector and an anode active material layer disposed on both surfaces of the anode current collector.

As the rechargeable battery is repeatedly charged and discharged, an internal pressure of a case may increase. When there is a significant increase in pressure, a safety apparatus for blocking the charging and discharging may be desired.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery having a short-circuit member capable of being stably deformed at a preset pressure when an internal pressure of a case increases.

An exemplary embodiment provides a rechargeable battery including an electrode assembly including first and second electrodes, a case receiving the electrode assembly, a cap plate coupled to the case and including a short-circuit opening formed therein, a first electrode terminal electrically connected to the first electrode, a second electrode terminal electrically connected to the second electrode, a short-circuit member fixed to the cap plate in the short-circuit opening and electrically connecting a cathode and an anode to each other, and a top insulation member installed so as to cover the short-circuit member and including a plurality of air holes formed therein.

The top insulation member may include a bottom plate disposed on the cap plate, a top plate facing the bottom plate, and a side wall connecting the bottom plate and the top plate to each other, and the air holes may be formed in the top plate.

The air holes may be arranged in a circumferential direction of the short-circuit member and formed in the side wall. In addition, the air holes may be arranged spaced apart from each other in a length direction of the side wall.

Further, a connection opening communicating with the short-circuit opening may be formed in the bottom plate, and a short-circuit tab electrically connected to the second electrode terminal may be inserted and disposed in the top insulation member.

Further, a discharge opening communicating with the short-circuit opening may be formed in the short-circuit tab, and the short-circuit tab may include a connection protrusion protruding to thereby be inserted into the discharge opening, wherein the connection protrusion is continuously formed in a circumferential direction of the discharge opening.

A blocking jaw continuously formed along a circumference of the discharge opening may be formed on a surface of the short-circuit tab facing the top plate, wherein a plurality of blocking jaws may be formed so as to form concentric circles.

The top insulation member may be provided with an opening part opened upwardly and include a top cover inserted into the opening part, and the air hole may be formed in the top cover.

According to an embodiment, since a plurality of air holes are formed in the top insulation member, when the short-circuit member is deformed, air in the top insulation member may be easily discharged. Therefore, the short-circuit member may be stably deformed at a preset pressure, and it is possible to prevent the short-circuit member from being distorted when the short-circuit member is deformed.

DETAILED DESCRIPTION

Figure 1:
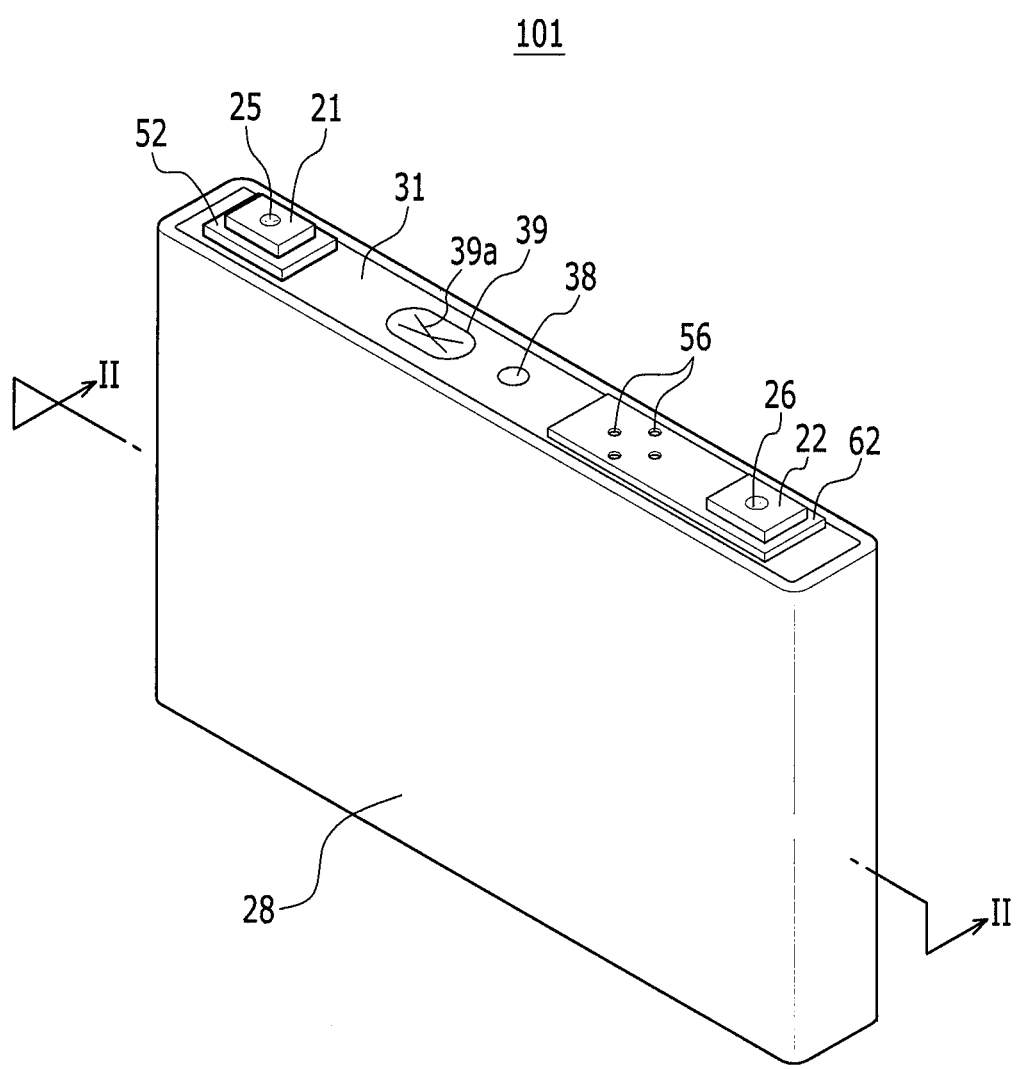
FIG. 1 is a perspective view of a rechargeable battery according to a first exemplary embodiment.

Hereinafter, exemplary embodiments will be described in detail with reference to the accompanying drawings so that those skilled in the art may easily practice the present invention. However, the present invention may be modified in various different ways and is not limited to the embodiments provided in the present description. Like reference numerals designate like elements throughout the specification and drawings.

Figure 2:
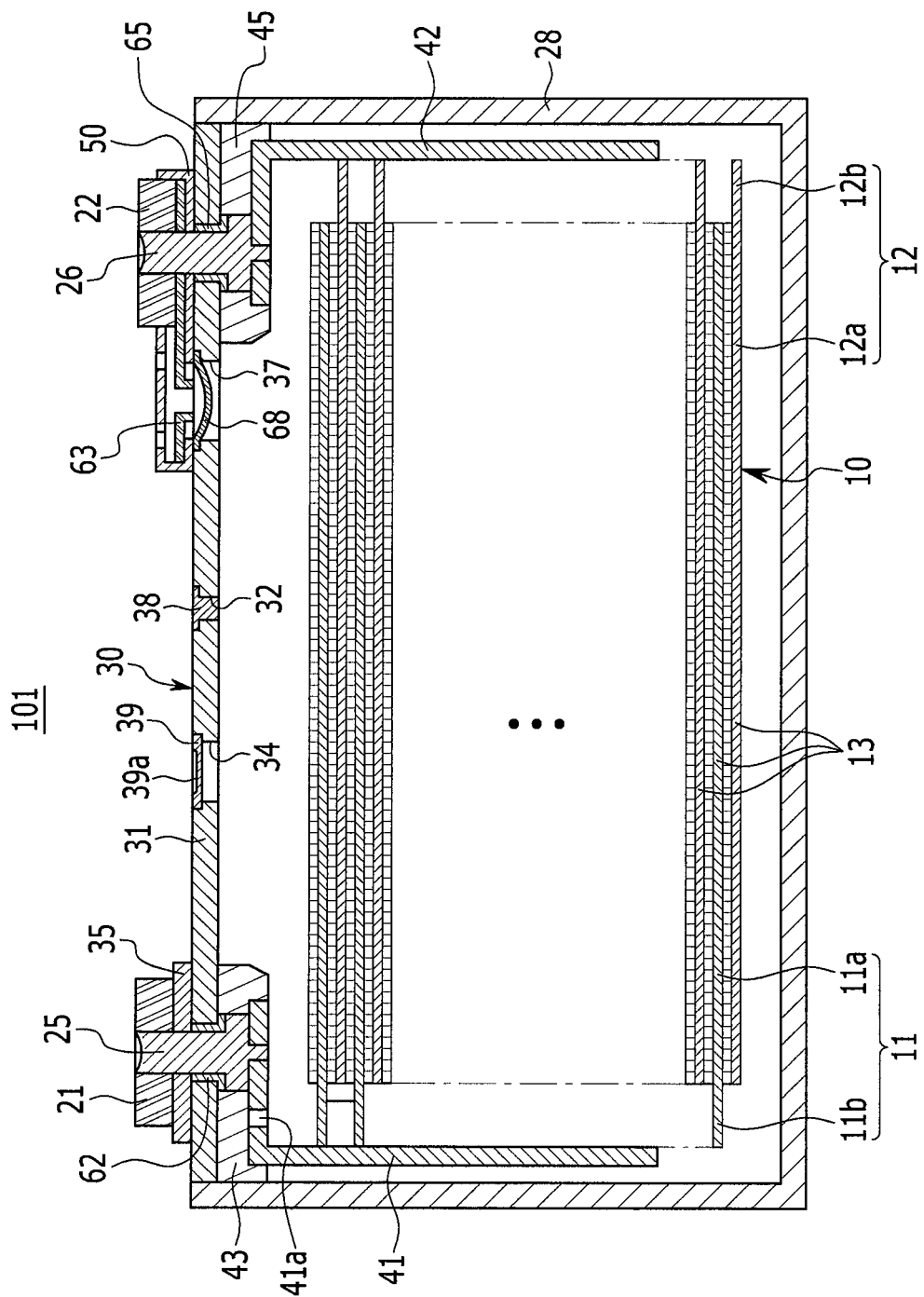
FIG. 2 is a cross-sectional view taken along line II-II of FIG. 1.

FIG. 1 is a perspective view showing a rechargeable battery according to a first exemplary embodiment and FIG. 2 is a cross-sectional view taken along line II-II of FIG. 1.

Referring to FIGS. 1 and 2, a rechargeable battery 101 according to the first exemplary embodiment includes an electrode assembly 10 formed by winding a cathode (first electrode) 11 and an anode (second electrode) 12 having a separator 13 interposed therebetween, a case 28 embedded with the electrode assembly 10, and a cap assembly 30 coupled to an opening part of the case 28.

As the rechargeable battery 101 according to the first exemplary embodiment, a lithium ion rechargeable battery having an angular shape will be described by way of example. However, the present invention is not limited thereto, and may be applied to batteries having various shapes such as a lithium polymer battery, a cylindrical battery, and the like.

The electrode assembly 10 may be formed by disposing the cathode 11 and the anode 12 on either surface of the separator 13, which is an insulation material, and then winding the cathode 11, the separator 13, and the anode 12 in a jelly-roll state.

The cathode 11 and the anode 12 include coated parts 11a and 12a formed by applying active materials on current collectors of metal plate, respectively, and uncoated parts 11b and 12b formed of current collectors exposed since active materials are not applied thereon.

The uncoated part 11b of the cathode 11 is formed at one end portion of the cathode 11 along the wound cathode 11. The uncoated part 12b of the anode 12 is formed at one end portion of the anode 12 along the wound anode 12. The uncoated parts 11b and 12b are disposed at both ends of the electrode assembly 10, respectively.

However, the present invention is not limited thereto, and the electrode assembly 10 may have a structure in which positive and anodes formed of a plurality of sheets are stacked, having a separator therebetween.

The case 28 may have an approximately rectangular parallelepiped shape, and an opened opening part is formed on one surface thereof. The case 28 may be made of a metal such as aluminum, stainless steel, or the like.

The cap assembly 30 includes a cap plate 31 covering the opening part of the case 28, a first electrode terminal (cathode terminal) 21 protruding outwardly of the cap plate 31 and electrically connected to the cathode 11, and a second electrode terminal (anode terminal) 22 protruding outwardly of the cap plate 31 and electrically connected to the anode 12.

The cap plate 31 has a long tetragonal plate shape continuously connected in one direction and is connected to the opening part of the case 28. The cap plate 31 is made of a metal such as aluminum, or the like. A sealing stopper 38 installed onto an electrolyte inlet 32, and a vent member 39 installed in the vent opening 34 and including a notch 31a formed therein and configured to be opened at the present pressure are installed in the cap plate 31.

The first and second electrode terminals 21 and 22 are installed to protrude upwardly of the cap plate 31. The first electrode terminal 21 is electrically connected to the cathode 11 via a first current collecting member 41, and the second electrode terminal 22 is electrically connected to the anode 12 via a second current collecting member 42. A fuse opening 41a is formed in the first current collecting member 41, and a portion at which the fuse opening 41a is formed has a cross-sectional area smaller than a vicinity thereof, when an over current flows, the portion at which fuse opening 41a is fused to thereby block the current.

A terminal connection member 25 electrically connecting the first electrode terminal 21 and the first current collecting member 41 to each other is installed between the first electrode terminal 21 and the first current collecting member 41. The terminal connection member 25 is inserted into an opening formed in the first electrode terminal 21, and an upper end thereof is fixed to the first electrode terminal 21 by welding, and a lower end thereof is fixed to the first current collecting member 41 by welding.

A gasket 62 for sealing between the terminal connection member 25 and the cap plate 31 is installed into the opening through which the terminal connection member 25 penetrates, and a lower insulation member 43 into which a lower portion of the terminal connection member 25 is inserted is formed below the cap plate 31.

A connection plate 35 electrically connecting the first electrode terminal 21 and the cap plate 31 to each other is installed below the first electrode terminal 21. The terminal connection member 25 is inserted and installed into the connection plate 35.

A terminal connection member 26 electrically connecting the second electrode terminal 22 and the second current collecting member 42 to each other is installed between the second electrode terminal 22 and the second current collecting member 42. The terminal connection member 26 is inserted into an opening formed in the second electrode terminal 22, and an upper end thereof is fixed to the second electrode terminal 22 by welding, and a lower end thereof is fixed to the second current collecting member 42 by welding.

A gasket 65 for sealing between the second electrode terminal 22 and the cap plate 31 is installed into the opening through which the terminal connection member 26 penetrating, and a lower insulation member 45 insulating the second electrode terminal 22 and the second current collecting member 42 from the cap plate 31 is installed below the cap plate 31.

The second electrode terminal 22 is installed with a short-circuit tab 63 so as to be electrically connected thereto, the short-circuit tab 63 being installed on the cap plate 31. A top insulation member 50 electrically insulating the short-circuit tab 63 and the cap plate 31 from each other is installed between the short-circuit tab 63 and the cap plate 31.

The cap assembly 30 includes a short-circuit member 68 shorting the cathode 11 and the anode 12, wherein the short-circuit member 68 is electrically connected to the cap plate 31 electrically connected to the cathode 11 and deformed when an internal pressure of the rechargeable battery 101 increases to thereby be connected to the short-circuit tab 63 electrically connected to the anode 12.

A short-circuit opening 37 is formed in the cap plate 31 and the short-circuit member 68 is disposed between the top insulation member 50 and the cap plate 31 in the short-circuit opening 37. A short-circuit groove extended outwardly is formed in an upper end of the short-circuit opening 37, and the short-circuit member 68 is partially insertedly disposed in the short-circuit groove.

The short-circuit member 68 has a circular plate shape and includes a plate shaped connection part and support parts formed at outer portions of the connection part. The connection part has an arc shaped longitudinal cross-section convexly protruding toward the short-circuit tab 63.

When the internal pressure of the rechargeable battery 101 increases, the short-circuit member 68 is deformed to electrically connect the cathode 11 and the anode 12 to each other such that the charged current may be discharged.

Figure 3:
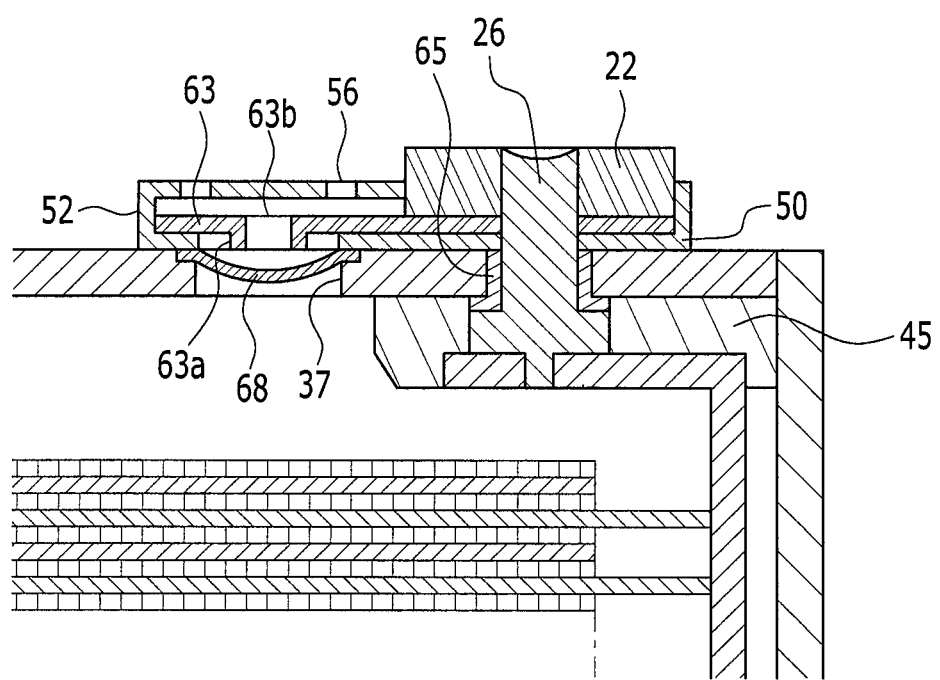
FIG. 3 is a partial cross-sectional view of the rechargeable battery according to the first exemplary embodiment.
Figure 4:
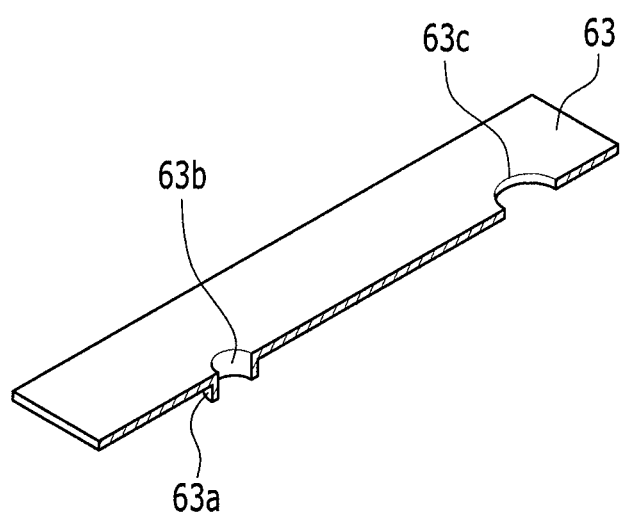
FIG. 4 is a cut-away perspective view showing a short-circuit tab of the rechargeable battery according to the first exemplary embodiment.

FIG. 3 is a partial cross-sectional view of the rechargeable battery according to the first exemplary embodiment, and FIG. 4 is a cut-away perspective view showing the short-circuit tab of the rechargeable battery according to the first exemplary embodiment.

Referring to FIGS. 3 and 4, the short-circuit tab 63 has a plate shape, and is installed into the top insulation member 50. A discharge opening 63b communicating with the short-circuit opening 37 is formed in the short-circuit tab 63, and a connection protrusion 63a protruding downwardly is formed around the discharge opening 63b. In one embodiment, the connection protrusion 63a is circumferentially continuous around the discharge opening 63 and has a circular cross-section. The connection protrusion 63a is inserted into a connection opening 53 (FIG. 5) formed in the top insulation member 50. The connection protrusion 63a is configured to contact the short-circuit member 68 when the short-circuit member 68 is deformed.

In one embodiment, a terminal opening 63c into which the terminal connection member 26 is inserted is formed in the short-circuit tab 63. The second electrode terminal 22 is disposed on the short-circuit tab 63 and partially covers the short-circuit tab 63. However, the discharge opening 63b is not covered by the second electrode terminal 22.

Figure 5:
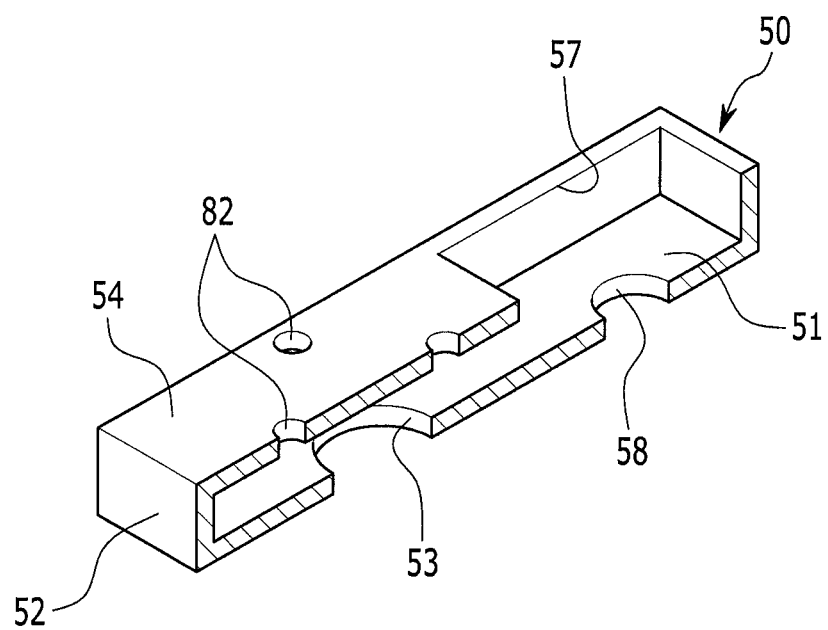
FIG. 5 is a cut-away perspective view showing a top insulation member of the rechargeable battery according to the first exemplary embodiment.

FIG. 5 is a cut-away perspective view showing a top insulation member of the rechargeable battery according to the first exemplary embodiment.

Referring to FIGS. 3 and 5, the top insulation member 50 includes a bottom plate 51 disposed on the cap plate 31, a top plate 54 disposed on the bottom plate 51, and a side wall 52 connecting the bottom plate 51 and the top plate 54 to each other.

The bottom plate 51 has a rectangular plate shape and is disposed on the cap plate 31 so as to contact the cap plate 31. A terminal opening 58 into which the terminal connection member 26 is inserted and the connection opening 53 disposed on the short-circuit opening 37 to communicate with the short-circuit opening 37 are formed in the bottom plate 51.

The top plate 54 is spaced from the bottom plate 51. An opening part 57 into which the second electrode terminal 22 is inserted is formed in the top plate 54, wherein the opening part 57 is positioned over the terminal opening 58.

In addition, a plurality of air holes 56 are formed in the top plate 54 and arranged in a circumferential direction of the short-circuit member 68. Four air holes 56 (FIG. 1) may be formed in the top plate 54, but the present invention is not limited thereto and any number and configuration of air holes may be sufficient.

If the air holes 56 are omitted from the top insulation member 50, air may be discharged through gaps between the members, but a discharge rate of air is slow, such that the short-circuit member 68 may not be deformed at the right time or the short-circuit member 68 can be distortedly deformed.

However, as described above, according to the present exemplary embodiment, when the short-circuit member 68 is deformed so as to be convex upwardly as the internal pressure of the case 28 increases, air present on the short-circuit member 68 may be easily discharged through the air holes 56.

In one embodiment, the short-circuit member 68 is stably deformed to contact the short-circuit tab 63 at a wide area. When the short-circuit member 68 and the short-circuit tab 63 are connected to each other, a significantly large amount of current flows in a short time. When the short-circuit member 68 is distorted to thereby partially contact the short-circuit tab 63, a large amount of heat is generated at a contact portion and thus, the short-circuit member 68 is fused, such that the current in the rechargeable battery 101 may not be stably discharged.

Figure 6:
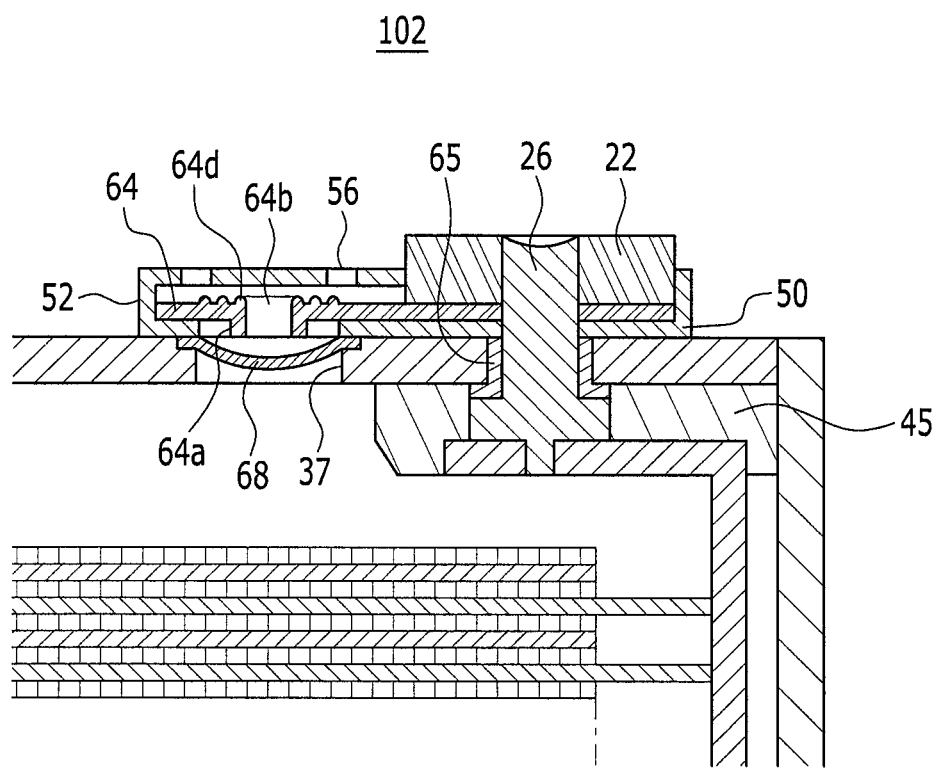
FIG. 6 is a partial cross-sectional view of a rechargeable battery according to a second exemplary embodiment.
Figure 7:
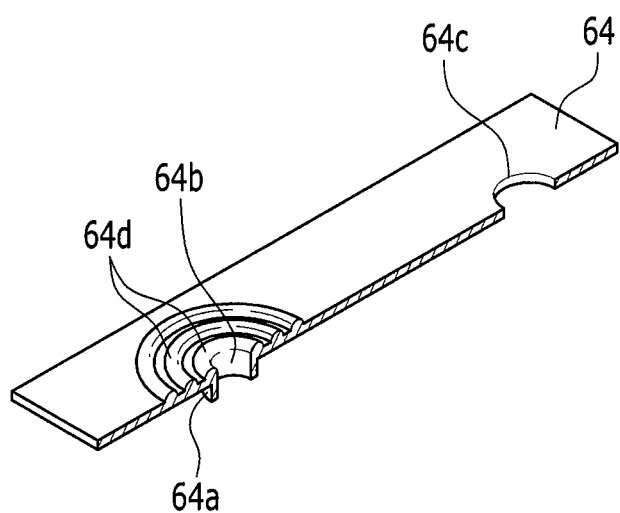
FIG. 7 is a cut-away perspective view showing a short-circuit tab of the rechargeable battery according to the second exemplary embodiment.

FIG. 6 is a partial cross-sectional view of a rechargeable battery according to a second exemplary embodiment, and FIG. 7 is a cut-away perspective view showing a short-circuit tab of the rechargeable battery according to the second exemplary embodiment.

Referring to FIGS. 6 and 7, the rechargeable battery 102 according to the present exemplary embodiment has the same structure as the rechargeable battery according to the first exemplary embodiment except for a structure of the short-circuit tab 64, a repeated description of the same structure will be omitted.

The short-circuit tab 64 according to the present exemplary embodiment has a tetragonal plate shape and is installed into the top insulation member 50. A discharge opening 64b communicating with the short-circuit opening 37 is formed in the short-circuit tab 64, and a connection protrusion 64a protruding downwardly is formed around the discharge opening 64b. The connection protrusion 64a is circumferentially continuous around the discharge opening 64b and has a circular cross-section. The connection protrusion 64a is inserted into a connection opening 53 formed in the top insulation member 50. The connection protrusion 64a is configured to contact the short-circuit member 68 when the short-circuit member 68 is deformed.

In one embodiment, a terminal opening 64c into which the terminal connection member 26 is inserted is formed in the short-circuit tab 64. The second electrode terminal 22 is disposed on the short-circuit tab 64 and partially covers the short-circuit tab 64.

A plurality of blocking jaws 64d are formed on a surface of the short-circuit tab 64 facing the top plate 54 of the top insulation member 50. The blocking jaws 64d protrude upwardly and are circumferentially continuous around the discharge opening 64b to thereby have a circular cross-section. The plurality of blocking jaws 64d are spaced from each other to form concentric circles. However, the present invention is not limited thereto, and a cross-section of the blocking jaw 64d may have a polygonal shape, or a random closed curve shape.

When the blocking jaws 64d are formed as in the present exemplary embodiment, even though a small amount of moisture is introduced through the air hole 56, it is possible to prevent the moisture from being introduced into the discharge opening 64b.

Figure 8:
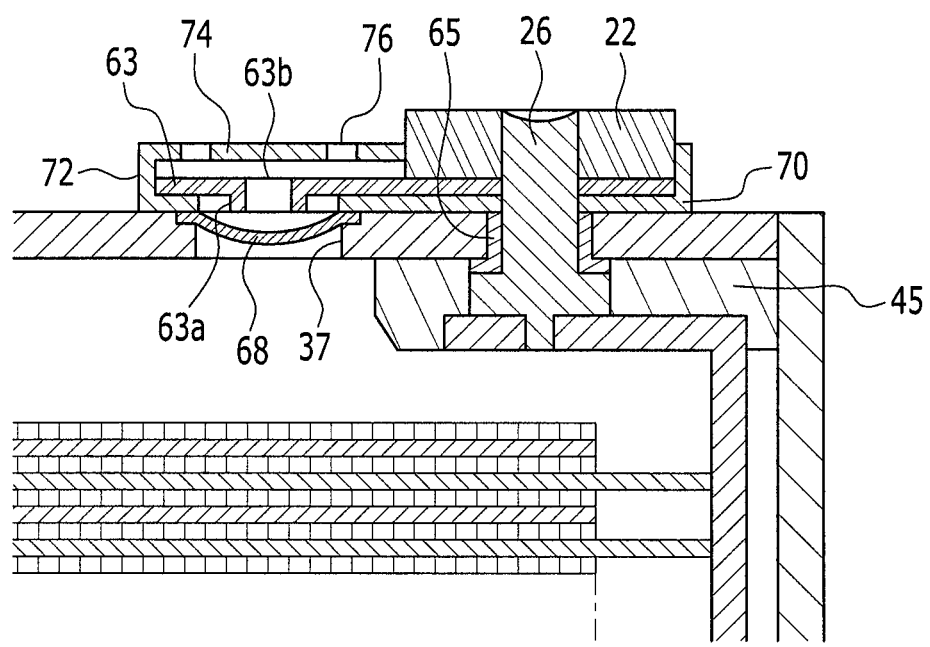
FIG. 8 is a partial cross-sectional view of a rechargeable battery according to a third exemplary embodiment.
Figure 9:
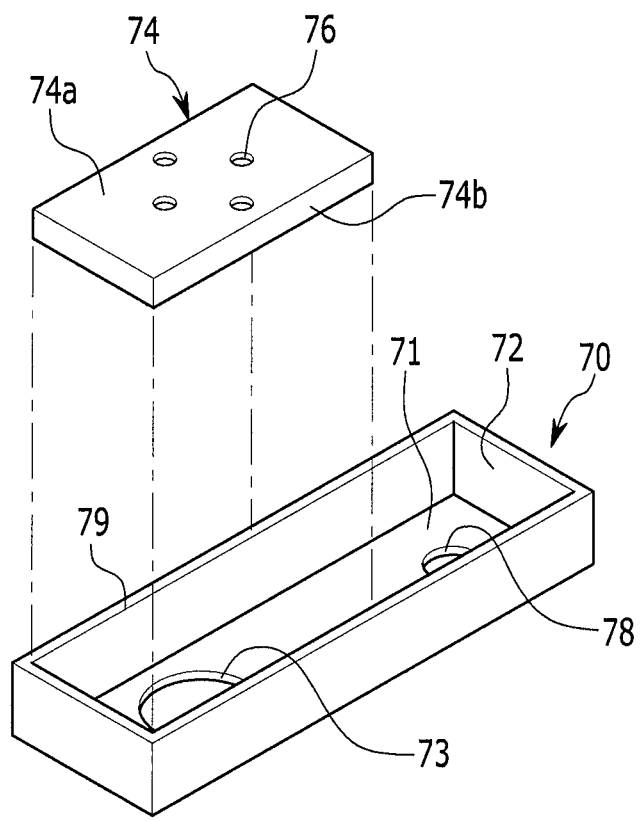
FIG. 9 is an exploded perspective view showing a top insulation member of the rechargeable battery according to the third exemplary embodiment.

FIG. 8 is a partial cross-sectional view of a rechargeable battery according to a third exemplary embodiment, and FIG. 9 is an exploded perspective view showing a top insulation member of the rechargeable battery according to the third exemplary embodiment.

Referring to FIGS. 8 and 9, the rechargeable battery 103 according to the present exemplary embodiment has the same structure as that of the rechargeable battery according to the first exemplary embodiment except for a structure of the top insulation member 70, an overlapped description of the same structure will be omitted.

The top insulation member 70 according to the present exemplary embodiment includes a bottom plate 71 disposed on the cap plate 31, a side wall 72 protruding upwardly from the bottom plate 71, and a top cover 74 inserted into the side wall 72.

The bottom plate 71 has a rectangular plate shape and is disposed on the cap plate 31 so as to contact the cap plate 31. A terminal opening 78 into which the terminal connection member 26 is inserted and the connection opening 73 disposed on the short-circuit opening 37 to communicate with the short-circuit opening 37 are formed in the bottom plate 71.

An opening part 79 is formed at an upper end of the side wall 72, and the second electrode terminal 22 and the top cover 74 are inserted into the opening part 79. The second electrode terminal 22 is disposed on the terminal opening 78, and the top cover 74 is disposed on the short-circuit opening 37.

The top cover 74 includes a support plate 74a and a support wall 74b protruding downwardly from the support plat 74a. The support plate 74a has a tetragonal plate shape, and the support wall 74b is continuously formed along a side end of the support plate 74a. The support plate 74a is spaced from the bottom plate 71, and a space is formed between the support plate 74a and the bottom plate 71.

A plurality of air holes 76 are formed in the top cover 74 and arranged in a circumferential direction of the short-circuit member 68. The air holes 76 are formed in the support plate 74a, and air in the top insulation member may be discharged to the outside through the air holes 76.

Figure 10:
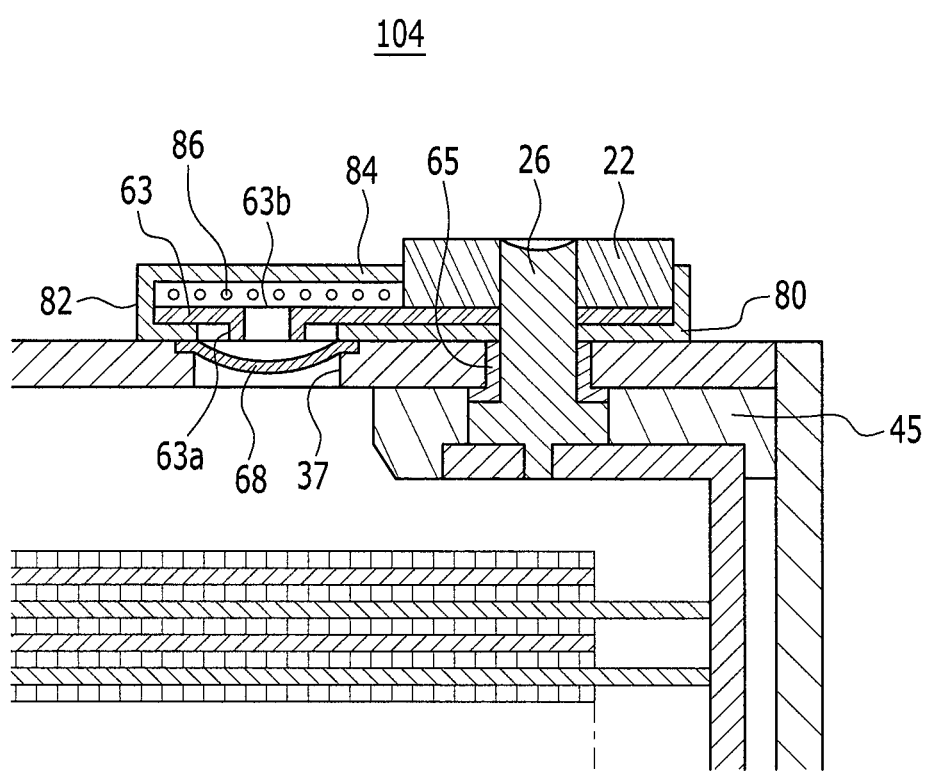
FIG. 10 is a partial cross-sectional view of a rechargeable battery according to a fourth exemplary embodiment.
Figure 11:
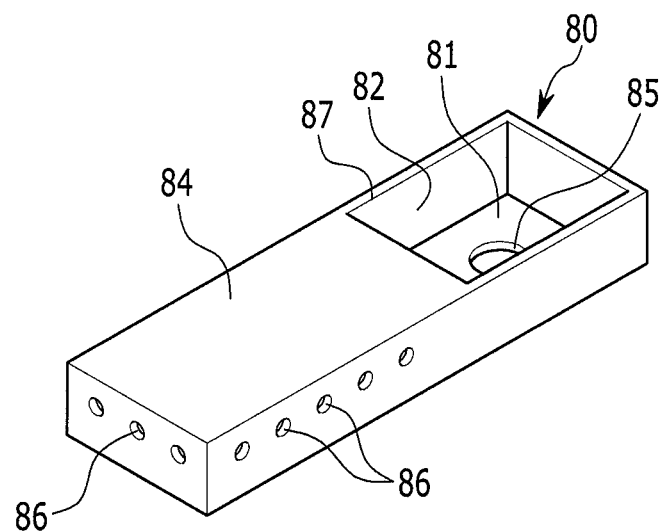
FIG. 11 is a perspective view showing a top insulation member of the rechargeable battery according to the fourth exemplary embodiment.
Figure 12:
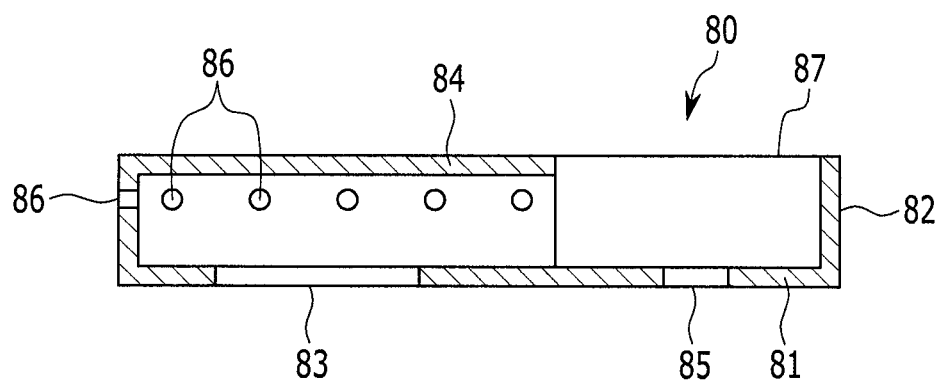
FIG. 12 is a longitudinal cross-sectional view showing the top insulation member of the rechargeable battery according to the fourth exemplary embodiment.

FIG. 10 is a partial cross-sectional view of a rechargeable battery according to a fourth exemplary embodiment, FIG. 11 is a perspective view showing a top insulation member of the rechargeable battery according to the fourth exemplary embodiment, and FIG. 12 is a longitudinal cross-sectional view showing the top insulation member of the rechargeable battery according to the fourth exemplary embodiment.

Referring to FIGS. 10 to 12, the rechargeable battery 104 according to the present exemplary embodiment has the same structure as that of the rechargeable battery according to the first exemplary embodiment except for a structure of the top insulation member 80, an overlapped description of the same structure will be omitted.

The top insulation member 80 according to the present exemplary embodiment includes a bottom plate 81 disposed on the cap plate 31, a top plate 84 disposed over the bottom plate 81, and a side wall 82 connecting the bottom plate 81 and the top plate 84 to each other.

The bottom plate 81 has a rectangular plate shape and is disposed on the cap plate 31 so as to contact the cap plate 31. A terminal opening 85 into which the terminal connection member 26 is inserted and a connection opening 83 disposed on the short-circuit opening 37 to communicate with the short-circuit opening 37 are formed in the bottom plate 81.

The top plate 84 is spaced from the bottom plate 81. An opening part 87 into which the second electrode terminal 22 is inserted is formed in the top plate 84, wherein the opening part 87 is positioned over the terminal opening 85.

In addition, a plurality of air holes 86 are formed in the side wall and arranged spaced from each other along a length direction of the side wall. Further, the air holes 86 are spaced from the bottom plate 81 and are located closer to the top plate 84 than the bottom plate 81.

When the air holes 86 are formed in the side wall 82 as in the present exemplary embodiment, air in the top insulation member 80 may be easily discharged. Further, since the air holes 86 are disposed to be spaced from a bottom, external moisture is not easily introduced into the top insulation member 80.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of symbols

| | |
|---|---|
| 101, 102, 103, 104: rechargeable battery | 10: electrode assembly |
| 11: cathode 12: anode | |
| 13: separator 21, 71: first electrode terminal | |
| 22: second electrode terminal 25, 26: terminal connection member | |
| 28: case 30: cap assembly | |
| 31: cap plate 32: electrolyte inlet | |
| 34: vent opening 37: short-circuit opening | |
| 38: sealing stopper 39: vent member | |
| 41: first current collecting member | 42: second current collecting member |
| 43, 45: lower insulation member 50, 70, 80: top insulation member | |
| 51, 74, 81: bottom plate 52, 72, 82: side wall | |
| 53, 73, 83: connection opening 54, 84: top plate | |
| 56, 76, 86: air hole 57, 87: opening part | |
| 58, 78, 85: terminal opening 63, 64: short-circuit tab | |
| 63a, 64a: connection protrusion 63b, 64b: discharge opening | |
| 63c, 64c: terminal opening 64d: blocking jaw | |
| 68: short-circuit member 74: top cover | |
| 74a: support plate 74b: support wall | |

What is claimed is:

1. A rechargeable battery comprising:
an electrode assembly including first and second electrodes;
a case accommodating the electrode assembly;
a cap plate coupled to the case and having a short-circuit opening;
a first electrode terminal electrically connected to the first electrode;
a second electrode terminal electrically connected to the second electrode;
a short-circuit member fixed to the cap plate in the short-circuit opening and configured to electrically connect the first electrode and the second electrode to each other;
a top insulation member covering the short-circuit member and having a plurality of air holes being exposed from the top insulation member such that air from within the battery can be discharged therethrough, wherein the top insulation member includes a bottom plate on the cap plate, a top plate facing the bottom plate, and a side wall connecting the bottom plate and the top plate to each other; and wherein the air holes are in the side wall.

2. The rechargeable battery of claim 1, wherein the air holes are arranged in a circumferential direction of the short-circuit member.

3. The rechargeable battery of claim 1, wherein the air holes are spaced from each other in a length direction of the side wall.

4. The rechargeable battery of claim 1, wherein the bottom plate has a connection opening communicating with the short-circuit opening.

5. The rechargeable battery of claim 1, wherein a short-circuit tab electrically connected to the second electrode terminal is in the top insulation member.

6. The rechargeable battery of claim 5, wherein the short-circuit tab has a discharge opening communicating with the short-circuit opening.

7. The rechargeable battery of claim 6, wherein the short-circuit tab includes a connection protrusion being continuous around a circumference of the discharge opening.

8. The rechargeable battery of claim 6, further comprising a blocking jaw circumferentially continuous around the discharge opening and on a surface of the short-circuit tab facing the top plate.

9. The rechargeable battery of claim 8, wherein the blocking jaw comprises a plurality of blocking jaws formed in concentric circles.

10. The rechargeable battery of claim 1, wherein the top insulation member has an opening part and includes a top cover, and wherein the plurality of air holes are formed in the top cover.

* * * * *